United States Patent
Chowdhury

(12) 
(10) Patent No.: US 9,715,558 B2
(45) Date of Patent: Jul. 25, 2017

(54) STRUCTURE-POSITION MAPPING OF XML WITH VARIABLE-LENGTH DATA

(75) Inventor: Sandeep Chowdhury, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1961 days.

(21) Appl. No.: 12/102,329

(22) Filed: Apr. 14, 2008

(65) Prior Publication Data

US 2009/0259616 A1    Oct. 15, 2009

(51) Int. Cl.
*G06F 17/30* (2006.01)

(52) U.S. Cl.
CPC .. *G06F 17/30929* (2013.01); *G06F 17/30908* (2013.01); *G06F 17/30923* (2013.01); *G06F 17/30979* (2013.01)

(58) Field of Classification Search
CPC ......... G06F 17/30929; G06F 17/30424; G06F 17/30938; G06F 17/30908; G06F 17/30923; G06F 17/30979
USPC .................................. 707/765, 769, 797, 803
See application file for complete search history.

(56) References Cited

U.S. PATENT DOCUMENTS

| 7,478,100 | B2 * | 1/2009 | Murthy et al. | |
| 7,627,604 | B2 * | 12/2009 | Furusho | |
| 2004/0060006 | A1 * | 3/2004 | Lindblad et al. | 715/513 |
| 2005/0187899 | A1 * | 8/2005 | Odagiri et al. | 707/1 |
| 2006/0075331 | A1 * | 4/2006 | Itani | 715/513 |
| 2006/0288276 | A1 * | 12/2006 | Odagiri et al. | 715/513 |

* cited by examiner

*Primary Examiner* — Rehana Perveen
*Assistant Examiner* — Huen Wong
(74) *Attorney, Agent, or Firm* — Lee Law, PLLC; Christopher B. Lee

(57) ABSTRACT

A programming technique is disclosed for linking (or "mapping") a query on the tree structure of an extensible markup language (XML) based computer-coded file to the "start" and "end" positions of the corresponding XML-coded data contained within the file, when the coded data has variable length in order to enhance the efficiency of querying an XML document (or other type of file).

14 Claims, 4 Drawing Sheets

TABLE 1: Computation of starting and ending positions of data in formatted XML file

| Node Id (depth first) (1) | Node Type (2) | Node Level (3) | Node Name/Value (4) | Total characters (5) | Cumulative or Ending position (6) | Starting position (bytes) (7) | Node Id (breath first) (8) |
|---|---|---|---|---|---|---|---|
| 1 | Element Name | 1 | <School> | 6 chars+2 brackets=8 | 8 | 1+1=2 (angle bracket+1) | 1 |
| 2 | Element Name | 2 | <Student | 7 chars+1 bracket+1 space=9 | 17 | 8+1+1=10 (cumulative+ angle bracket+1) | 2 |
| 3 | Attribute | 3 | id=" | 2 + 2 = 4 | 21 | 17+1=18 | 4 |
|  |  |  | S001"> | 4 + 2 = 6 | 27 | 21+1=22 |  |
| 4 | Element Name | 3 | <Name> | 4 chars + 2 brackets=6 | 33 | 27+1+1=29 | 5 |
| 5 | Element Value | 4 | Peter Blazer | 12 chars = 12 | 45 | 33+1=34 | 12 |
|  | Decrease |  | </Name> | 4 chars + 3 = 7 | 52 | 45 + 3 = 48 |  |
| 6 | Element Name | 3 | <Address> | 7 + 2 = 9 | 61 | 52 + 2 = 54 | 6 |
| 7 | Element Name | 4 | <HouseNumber> | 11 + 2 = 13 | 74 | 61 + 2 = 63 | 13 |
| 8 | Element Value | 5 | 12/3 | 4 | 78 | 74 + 1 = 75 | 21 |
|  | Decrease |  | </HouseNumber> | 11 + 3 = 14 | 92 | 78 + 3 = 81 |  |
| 9 | Element Name | 4 | <Street> | 6 + 2 = 8 | 100 | 92 + 2 = 94 | 14 |
| 10 | Element Value | 5 | Green Avenue | 12 | 112 | 100 + 1 = 101 | 22 |
|  | Decrease |  | </Street> | 6 + 3 = 9 | 121 | 112 + 3 = 115 |  |
| 11 | Element Name | 4 | <PostalCode> | 10 + 2 = 12 | 133 | 121 + 2 = 123 | 15 |
| 12 | Element Value | 5 | 120057 | 6 | 139 | 133 + 1 = 134 | 23 |
|  | Decrease |  | </PostalCode> | 10 + 3 = 13 | 152 | 139 + 3 = 142 |  |
|  | Decrease |  | </Address> | 7 + 3 = 10 | 162 | 152 + 3 = 155 |  |
| 13 | Element Name | 3 | <GPA> | 3 + 2 = 5 | 167 | 162 + 2 = 164 | 7 |

FIG. 3A
(Continued on Sheet 4)

(Continued from Sheet 3)

| | | | | | | |
|---|---|---|---|---|---|---|
| 14 | Element Value | 4 | | 6.8 | 3 | 167 + 1 = 168 | 16 |
| | | | Decrease | </GPA> | 3 + 3 = 6 | 170 | 170 + 3 = 173 | |
| | | | Decrease | </Student> | 7 + 3 = 10 | 176 | 176 + 3 = 179 | |
| 15 | Element Name | 2 | | <Teacher | 7 + 2 = 9 | 186 | 186 + 2 = 188 | 3 |
| 16 | Attribute | 3 | | id=" | 2 + 2 = 4 | 195 | 195 + 1 = 196 | 8 |
| | | | | T001" | 4 + 2 = 6 (quote + trailing space) | 199 | 199 + 1 = 200 | |
| 17 | Attribute | 3 | | dept=" | 4 + 2 = 6 | 205 | 205 + 1 = 206 | 9 |
| | | | | D001"> | 4 + 2 = 6 | 211 | 211 + 1 = 212 | |
| 18 | Element Name | 3 | | <Name> | 4 + 2 = 6 | 217 | 217 + 2 = 219 | 10 |
| 19 | Element Value | 4 | | Tarun Paul | 10 | 223 | 223 + 1 = 224 | 17 |
| | | | Decrease | </Name> | 4 + 3 = 7 | 233 | 233 + 3 = 236 | |
| 20 | Element Name | 3 | | <Address> | 7 + 2 = 9 | 240 | 240 + 2 = 242 | 11 |
| 21 | Element Name | 3 | | <HouseNumber> | 11 + 2 = 13 | 249 | 249 + 2 = 251 | 18 |
| 22 | Element Value | 5 | | 22/5 | 4 | 262 | 262 + 1 = 263 | 24 |
| | | | Decrease | </HouseNumber> | 11 + 3 = 14 | 266 | 266 + 3 = 269 | |
| 23 | Element Name | 4 | | <Street> | 6 + 2 = 8 | 280 | 280 + 2 = 282 | 19 |
| 24 | Element Value | 5 | | LakeView Road | 13 | 288 | 288 + 1 = 289 | 25 |
| | | | Decrease | </Street> | 6 + 3 = 9 | 301 | 301 + 3 = 304 | |
| 25 | Element Name | 4 | | <PostalCode> | 10 + 2 = 12 | 310 | 310 + 2 = 312 | 20 |
| 26 | Element Value | 5 | | 320066 | 6 | 322 | 322 + 1 = 323 | 26 |
| | | | | </PostalCode> | 10 + 3 = 13 | 328 | 328 + 3 = 331 | |
| | | | | </Address> | 7 + 3 = 10 | 341 | 341 + 3 = 344 | |
| | | | | </Teacher> | 7 + 3 = 10 | 351 | 351 + 3 = 354 | |
| | | | | </School> | 6 + 3 = 9 | 361 | 361 + 3 = 364 | |

FIG. 3B

STRUCTURE-POSITION MAPPING OF XML WITH VARIABLE-LENGTH DATA

FIELD OF THE INVENTION

The present invention relates generally to querying of an extensible markup language (XML) based data.

BACKGROUND OF THE INVENTION

A programming technique is disclosed for linking (or "mapping") a query expression on the tree structure of an extensible markup language (XML) based computer-coded data to the "start" and "end" positions of the corresponding XML-coded data contained when the coded data has variable length, in order to enhance the efficiency of querying an XML document (or other type of data based on tree structure).

The technique is applicable to XML-coded data that does not contain "redundant whitespaces" (i.e., no new character(s) between XML "tags" and otherwise limiting non-character entries to the minimum number necessary for the XML expression to be well-formed) or otherwise utilizes appropriate correction factors to account for "whitespaces".

Previous techniques of querying an XML-coded file (involving use of programs such as XQuery and XPath) require the entire XML data file to be examined (or "read") in order to perform a search for the desired data, resulting in more "file read" operations and potentially causing "memory overload" for the storage locations containing XML data files. In contrast, use of the present invention does not require all XML-coded data residing in a file to be loaded into memory for performance of the query search, thus providing memory use efficiency (and advantages over conventional methods).

SUMMARY OF THE INVENTION

In accordance with at least one presently preferred embodiment of the present invention, there is broadly contemplated herein a programming technique to link (or "map") a query expression on the tree structure of an extensible markup language (XML) based computer-coded data to the "start" and "end" positions of the corresponding XML-coded data, when the coded data has variable length. The "start" and "end" positions of the XML data can be defined by "byte positions" in which the variable code length can be specified in terms of the number of binary digits (separated into groups of eight digits, i.e., "bytes") that it contains. Alternately, these "start" and "end" positions can be defined in terms of "character positions" in which the variable code length can be specified by the number of text characters contained in the XML-coded data.

The programming technique proposed by this invention requires a single examination (or "parsing") of the XML-coded file to determine the exact (current) lengths of data element and attribute names and values, along with the "file header length" containing "metadata" providing identifying (and other) information necessary for the data file to be processed. These lengths can be defined in terms of either "character length" or "byte length" depending on the type of XML query structure position mapping (i.e., character-based or byte-based) being used. The length of each data element or attribute can be determined by "parsing" the XML data.

In summary, one aspect of the invention provides a computer system comprised of a computer processor configured for executing program instructions stored in computer memory and arranged for linking a query on the tree structure of an extensible markup language (XML) computer file to the start and end positions of coded data element(s), the system comprising: an arrangement for defining the start and end positions of a queried data element by byte positions where code length is specified by a defined number of binary digits; or an arrangement for defining the start and end positions of a queried data element by character positions where code length is specified by a defined number of text characters; wherein the coded data has variable length.

Another aspect of the invention provides a method of linking a query on the tree structure of an extensible markup language (XML) computer data to the start and end positions of coded data element(s), the method comprising the steps of: defining the start and end positions of a queried data element by byte positions where code length is specified by a defined number of binary digits; or defining the start and end positions of a queried data element by character positions where code length is specified by a defined number of text characters; wherein the coded data has variable length.

Furthermore, an additional aspect of the invention provides a computer program storage device readable by a computer processor machine, tangibly embodying a program of instructions executable by the machine to perform a method of linking a query on the tree structure of an extensible markup language (XML) computer file to the start and end positions of coded data element(s), the method comprising the steps of: defining the start and end positions of a queried data element by byte positions where code length is specified by a defined number of binary digits; or defining the start and end positions of a queried data element by character positions where code length is specified by a defined number of text characters; wherein the coded data has variable length.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 3A-3B illustrates a formatted XML data file with which a preferred embodiment of the present invention can be used.

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1-3B, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 1:
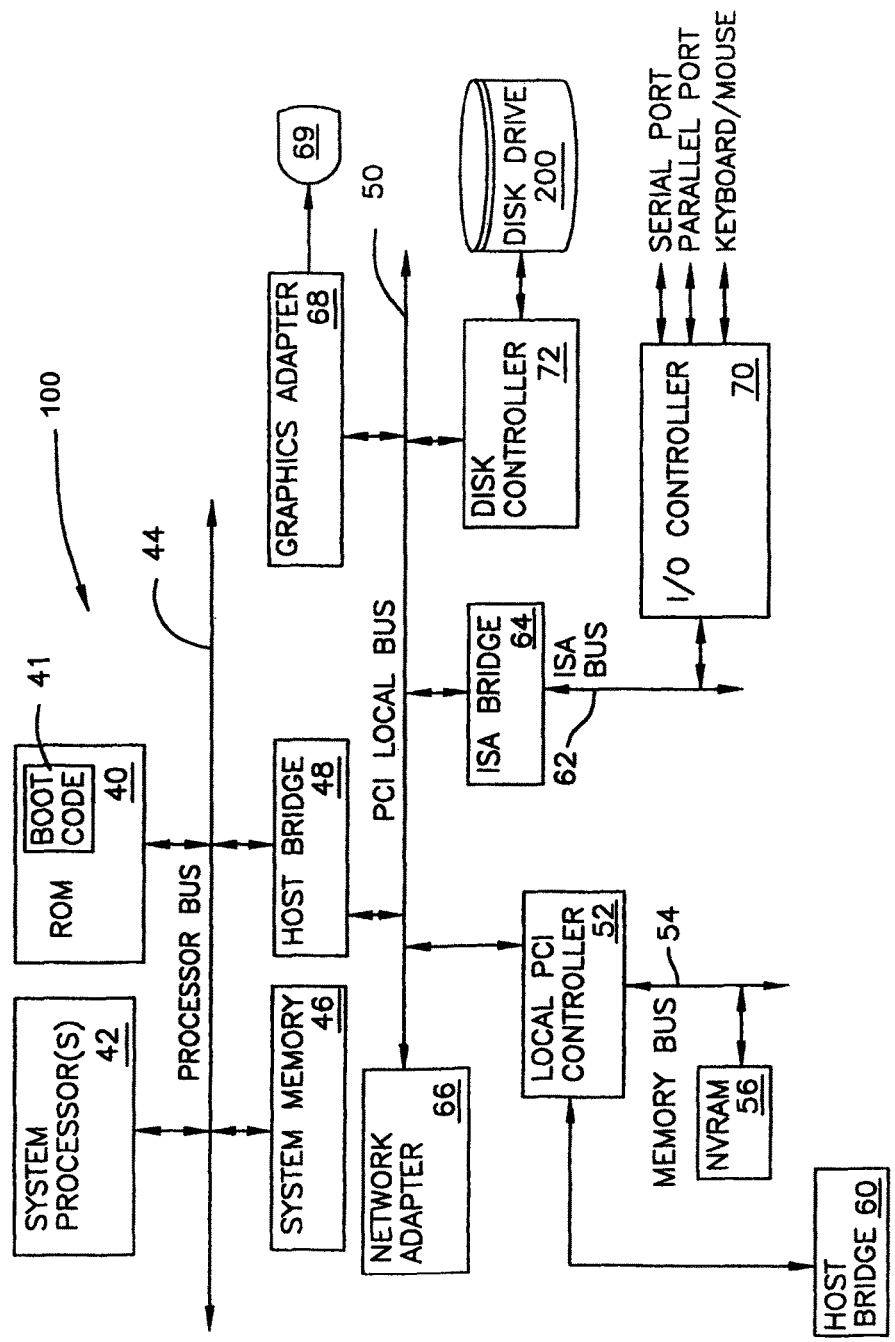
FIG. 1 schematically illustrates a computer system with which a preferred embodiment of the present invention can be used.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, the present invention is applicable to any data processing system. Notebook computers, as may be generally referred to or understood herein, may also alternatively be referred to as "notebooks", "laptops", "laptop computers" or "mobile computers".

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to a local area network (LAN), and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard and mouse. In addition, I/O controller 70 supports external communication by computer system 100 via serial and parallel ports, including communication over a wide area network (WAN) such as the Internet. A disk controller 72 is in communication with a disk drive 200 for accessing external memory. Of course, it should be appreciated that the system 100 may be built with different chip sets and a different bus structure, as well as with any other suitable substitute components, while providing comparable or analogous functions to those discussed above.

The following unformatted XML data file is used as an example to illustrate the XML structure position mapping implemented by the invention:

```
<School>
    <Student id="S001">
        <Name>Peter Blazer</Name>
        <Address>
            <HouseNumber>12/3</HouseNumber>
            <Street>Green Avenue</Street>
            <PostalCode>120057</PostalCode>
        </Address>
        <GPA>6.8</GPA>
    </Student>
    <Teacher id="T001" dept="D001">
        <Name>Tarun Paul</Teacher>
        <Address>
            <HouseNumber>22/5</HouseNumber>
            <Street>LakeView Road</Street>
            <PostalCode>320066</PostalCode>
        </Address>
    </Teacher>
</School>
```

The (above) example unformatted XML data file can be encoded in the formatted manner shown in FIG. 3A-3B with depth-first numeric node IDs in Column 1 titled "Node ID (depth first)" to implement XML structure position mapping to breadth-first numeric node IDs in column (8) titled "Node ID (breadth first)" (See FIG. 2 description below) using "byte positions" (such that a single text character is defined by XML code having a length of eight binary digits or a single byte)(as with ASCII coded characters) thereby allowing the same code length computations to also be used for "character position" queries. (Certain coding adjustments are required for calculation of "byte positions" when one text character encodes to more than one byte as explained below.) Using this technique, the formatted XML data file does not contain "newline characters" or "beautifying spaces" as with the unformatted file. FIG. 3A-3B shows the starting and ending positions of "node names" (and/or "attribute values") with the "node names" being shown in <angle brackets> for clarity in computing byte (or character) starting positions which are not contained within the "node names", and with "attribute values" being shown within "quotes" for clarity in computing starting positions which are not part of the "attribute values". FIG. 3A-3B shows "metadata" consisting of the lengths of data element and attribute names and values linked (or "mapped") to each "node ID" as determined using a parser program (such as the SAX parser which examines XML data in "depth-first" order).

Figure 2:
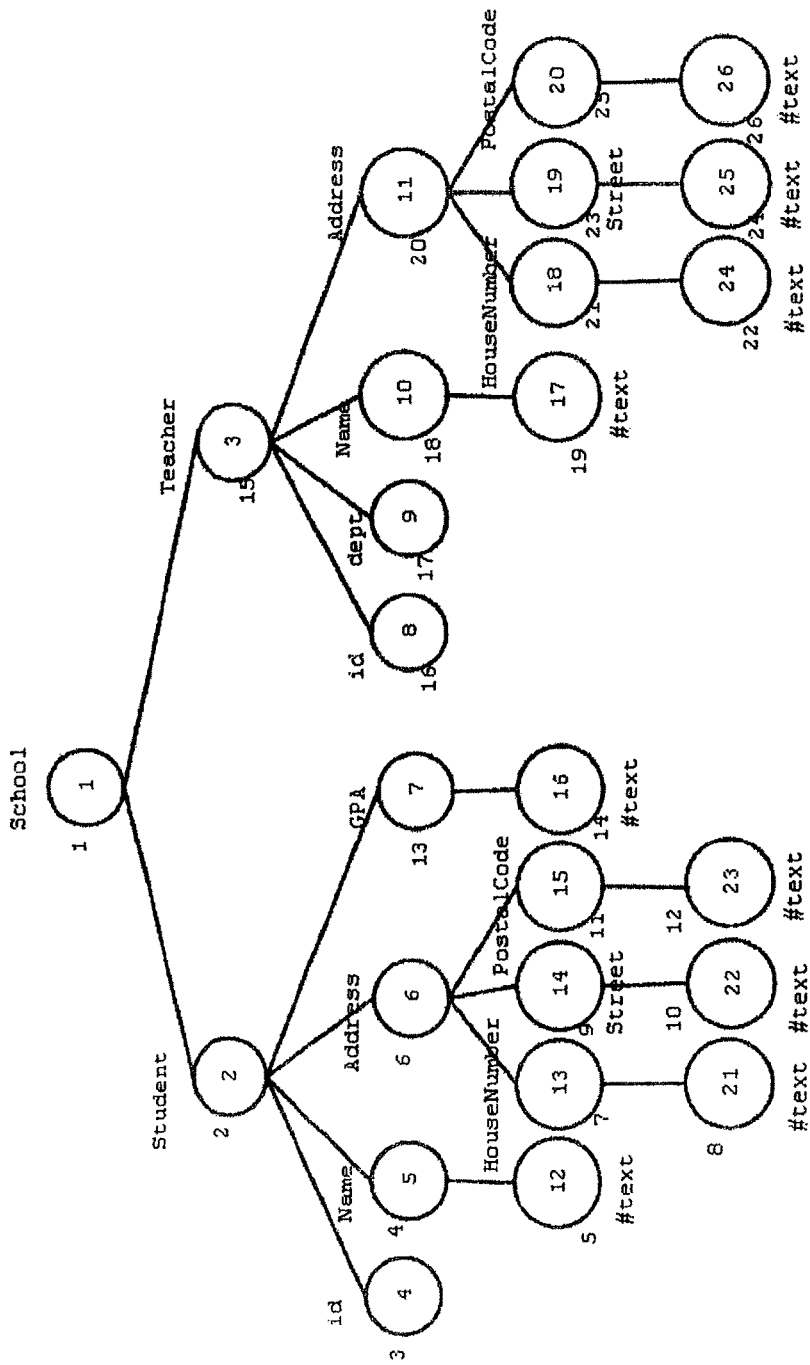
FIG. 2 illustrates a code structure used for a formatted XML data file with which a preferred embodiment of the present invention can be used.

FIG. 2 shows the tree structure of the XML data file with numeric node IDs within the circular node elements numbered according to breadth-first order and mapped to numeric node IDs to the left of the respective circular node elements numbered according to depth-first order, as represented within FIG. 3A-3B.

The type of node (referenced in FIG. 2 and Column 2 of FIG. 3A-3B) can be either of the following:
1. Element Name
2. Element Value
3. Attribute The following computational steps are taken to determine the starting position of a node in the structure of FIG. 2 when representing the entries in the formatted XML data file of FIG. 3A-3B (nodes are in depth-first order):

starting position of an Element Name=sum$EN$+num$EN$*2+sum$EV$+sum$AN$+sum$AV$+num$AN$*4+sum$LD$+num$LD$*3+2 starting position of an Element Value=sum$EN$+num$EN$*2+sum$EV$+sum$AN$+sum$AV$+num$AN$*4+sum$LD$+num$LD$*3+1 starting position of an Attribute Name=sum$EN$+num$EN$*2+sum$EV$+sum$AN$+sum$AV$+num$AN$*4+sum$LD$+num$LD$*3+1 starting position of an Attribute Value=Starting position of an Attribute Name+length$AN$+2 ending position of node=starting position of node+length of node−1 where:
sumEN=sum of lengths of Element Names before computed node starting position
sumEV=sum of lengths of Element Values before computed node starting position
sumAN=sum of lengths of Attribute Names before computed node starting position
sumAV=sum of lengths of Attribute Values before computed node starting position
sumLD=sum of lengths of Level Decreases before computed node start position
numEN=number of Element Nodes before computed node starting position
numAN=number of Attributes before computed node starting position
numLD=number of Level Decreases before computed node starting position The above expressions are given with the assumption that one text character is encoded using one data byte (such as with UTF-8). The adjustments for other encodings are as follows:
numEN*2 where the "2" in the above expression represents the characters <, > or < or a single space (refer to FIG. 3A-3B) such that "2" may change in the above expression depending on the number of bytes taken to encode these characters
numAN*4 where the "4" in the above expression represents the characters=, 'single' or "double" start quote, 'single' or "double" end quote, > such that "4" may change in the above expression depending on the number of bytes taken to encode these characters
numLD*3 where the "3" in the above expression represents the characters <,/, > such that "3" may change in the above expression depending on the number of bytes taken to encode these characters The trailing "+2" in the starting position of an Element Name expression represents the character "<"+1 such that if n bytes are used to encode "<" then +2 should be changed to n+1

The trailing +2 in the starting position of an Attribute Value expression represents the characters=and 'single' or "double" quotes such that if n bytes are used to represent the characters mentioned above then +2 should be changed to +n A fragment has a "root node" which is equivalent to its "fragment ID" so the starting position of the fragment is the starting position of its "root node" as computed in the same way as described above.

ending position of fragment=ending position of last node in fragment+sum$LD$+num$LD$*3 where
sumLD=Sum of level decreases between last node of the fragment and next node
numLD=Number of level decreases between last node of the fragment and next node If the last node of the fragment is also the last node of the tree, the next node is taken as the root node (whose level is 1) and as mentioned previously adjustment for encoding needs to be applied for this expression. For example, the ending position of fragment with node ID 6 (depth-first) is computed by considering the last node of the fragment (which is 12) (see FIG. 2).

Example Computations of Starting Positions of Some Nodes
Starting position of node 10 (which is an Element Value):
Here sumEN=sum of the first part (before the + sign) of column (5) for Element Names up to node 9. Therefore sumEN=6+7+4+7+11+6=41
numEN=number of Element Names up to node 9=6 (nodes 1/2/4/6/7/9)
sumEV=sum of the first part (before the + sign) of column (5) for Element Values up to node 9. Therefore sumEV=12+4=16
sumAN=sum of the first part (before the + sign) of column (5) for Attribute Names up to node 9. Therefore sumAN=2
sumAV=sum of the first part (before the + sign) of column (5) for Attribute Values up to node 9. Therefore sumAV=4
numAN=number of Attribute Names up to node 9=1 (node 3)
sumLD=sum of the first part (before the + sign) of column (5) for Level Decreases up to node 9. Therefore sumLD=4+11=15
numLD=number of Level Decreases up to node 9=2 (between nodes 5/6 and nodes 8/9).
Starting position of node 10=sumEN+numEN*2+sumEV+sumAN+sumAV+numAN*4+sumLD+numLD*3+1=41+6*2+16+2+4+1*4+15+2*3+1=101
Ending Position of node 10=Starting Position of node 10+length of node 10+1=101+12−1=112

If the header length of the XML file is h bytes (i.e. the body of the file starts immediately after the header length without space) then the (actual) starting position of node 10=h+101 and the (actual) ending position of node 10=h+112. From the starting and ending positions the value of node 10 is directly read from the XML data (for the example in FIGS. 2 & 3 it is Green Avenue).
Starting position of node 6 (which is an Element Name)=17+3*2+12+2+4+1*4+4+1*3+2=54
Starting position of node 17 (which is an Attribute Name)=61+9*2+37+4+8+2*4+48+7*3+1=206
Starting position (of value) of node 17=Starting position of node 17+length of Attribute Name of node 17+2=206+4+2=212
Ending Position of fragment 6 (depth-first)=Ending Position of node 12 (depth-first)+sumLD+numLD*3

Starting Position of node 12 (depth-first node ID):
sumEN=6+7+4+7+11+6+10=51
numEN=7
sumEV=12+4+12=28
sumAN=2
sumAV=4
numAN=1
sumLD=4+11+6=21
numLD=3
Starting Position of node 12=sumEN+numEN*2+sumEV+ sumAN+sumAV+numAN*4+sumLD+numLD*3+1=51+ 7*2+28+2+4+1*4+21+3*3+1=134
Ending Position of node 12=Starting Position+length of node−1=134+6−1=139
Level of node 12=5
Level of node 13=3
Number of level decrease (numLD)=5−3=2
Sum of level decrease (sumLD)=10+7=17
sumLD+numLD*3=17+2*3=23
Ending Position of fragment 6 (depth-first)=Ending Position of node 12+sumLD+numLD*3=139+17+2*3=162

Input of node IDs is not required if proper tooling is available and an XML template file is used. A node can be graphically selected and the "tooling program" can generate the corresponding node ID along with the code of the XML file. Retrieval of a fragment is similar to retrieval of a node where tooling is used to generate the fragment ID of a fragment. An "update" operation is similar to a "retrieve" operation where the starting and ending positions are determined and the new value is replaced between the starting and ending positions (inclusive).

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method, comprising:
   generating, within a memory, an extensible markup language (XML) position mapping structure of a tree structure of an XML computer data file, where the XML position mapping structure encodes each of coded data elements of variable length represented as nodes of the tree structure of the XML computer data file, a node type of each node of the coded data elements represented in the tree structure of the XML computer data file, a node level number of each node of the coded data elements represented in the tree structure of the XML computer data file, and at least one of a depth-first numeric node identifier (ID) and a breadth-first numeric node identifier (ID) of each node of the coded data elements represented in the tree structure of the XML computer data file;
   defining, within the XML position mapping structure, starting and ending positions of each coded data element within the XML computer data file by byte positions where code length is specified by a defined number of binary digits; or
   defining, within the XML position mapping structure, the starting and ending positions of each coded data element within the XML computer data file by character positions where code length is specified by a defined number of text characters; and
   the method further comprising:
   linking, in response to a query search on the tree structure of the XML computer data file for a coded data element of the XML computer data file, the query search via the XML position mapping structure to the starting and ending positions of the coded data element of the XML computer data file; and
   parsing the XML computer data file to determine:
   current code lengths of data element and attribute names and values; and
   file header length containing metadata.

2. The method of claim 1, where a data element or attribute is parsed using a parsing program.

3. The method of claim 1, further comprising using at least one of the following computational steps to determine the starting and ending position(s) of a node when the nodes of the coded data element(s) are in depth-first order:
   starting position of an element name=sumEN+numEN*2+sumEV+sumAN+sumAV+numAN*4+ sumLD+numLD*3+2;
   starting position of an element value=sumEN+numEN*2+sumEV+sumAN+sumAV+numAN*4+ sumLD+numLD*3+1;
   starting position of an attribute name=sumEN+numEN*2+sumEV+sumAN+sumAV+numAN*4+ sumLD+numLD*3+1;
   starting position of an attribute value=starting position of an attribute name+lengthAN+2;
   ending position of a node=starting position of node+ length of node−1; or
   ending position of a fragment=ending position of last node in fragment+sumLD+numLD*3.

4. The method of claim 1, where the numeric node identifier (ID) for each node of the coded data elements comprises the breadth-first numeric node identifier (ID) and further comprising mapping each breadth-first numeric node identifier (ID) to the depth-first numeric node identifier (ID) within the generated XML position mapping structure.

5. A computer system comprising:
   a memory; and
   a processor programmed to:
   generate, within the memory, an extensible markup language (XML) position mapping structure of a tree structure of an XML computer data file, where the XML position mapping structure encodes each of coded data elements of variable length represented as nodes of the tree structure of the XML computer data file, a node type of each node of the coded data elements represented in the tree structure of the XML computer data file, a node level number of each node of the coded data elements represented in the tree structure of the XML computer data file, and at least one of a depth-first numeric node identifier (ID) and a breadth-first numeric node identifier (ID) of each node of the coded data elements represented in the tree structure of the XML computer data file;

define, within the XML position mapping structure, starting and ending positions of each coded data element within the XML computer data file by byte positions where code length is specified by a defined number of binary digits; or define, within the XML position mapping structure, the starting and ending positions of each coded data element within the XML computer data file by character positions where code length is specified by a defined number of text characters; and where the processor is further programmed to:
link, in response to a query search on the tree structure of the XML computer data file for a coded data element of the XML computer data file, the query search via the XML position mapping structure to the starting and ending positions of the coded data element of the XML computer data file; and parse the XML computer data file to determine:
current code lengths of data element and attribute names and values; and
file header length containing metadata.

6. The system of claim 5, where a data element or attribute is parsed using a parsing program.

7. The system of claim 5, where the processor is further programmed to use at least one of the following computational steps to determine the starting and ending position(s) of a node when the nodes of the coded data element(s) are in depth-first order:
starting position of an element name=sumEN+numEN*2+sumEV+sumAN+sumAV+numAN*4+sumLD+numLD*3+2;
starting position of an element value=sumEN+numEN*2+sumEV+sumAN+sumAV+numAN*4+sumLD+numLD*3+1;
starting position of an attribute name=sumEN+numEN*2+sumEV+sumAN+sumAV+numAN*4+sumLD+numLD*3+1;
starting position of an attribute value=starting position of an attribute name+lengthAN+2;
ending position of a node=starting position of node+length of node−1; or
ending position of a fragment=ending position of last node in fragment+sumLD+numLD*3.

8. The system of claim 5, where the numeric node identifier (ID) for each node of the coded data elements comprises the breadth-first numeric node identifier (ID) and the processor is further programmed to map each breadth-first numeric node identifier (ID) to the depth-first numeric node identifier (ID) within the generated XML position mapping structure.

9. A computer program storage device readable by a computer processor machine, tangibly embodying a program of instructions executable by the machine, where the instructions, when executed, cause the machine to:
generate, within a memory, an extensible markup language (XML) position mapping structure of a tree structure of an XML computer data file, where the XML position mapping structure encodes each of coded data elements of variable length represented as nodes of the tree structure of the XML computer data file, a node type of each node of the coded data elements represented in the tree structure of the XML computer data file, a node level number of each node of the coded data elements represented in the tree structure of the XML computer data file, and at least one of a depth-first numeric node identifier (ID) and a breadth-first numeric node identifier (ID) of each node of the coded data elements represented in the tree structure of the XML computer data file;

define, within the XML position mapping structure, starting and ending positions of each coded data element within the XML computer data file by byte positions where code length is specified by a defined number of binary digits; or define, within the XML position mapping structure, the starting and ending positions of each coded data element within the XML computer data file by character positions where code length is specified by a defined number of text characters; and where the instructions, when executed, further cause the machine to:
link, in response to a query search on the tree structure of the XML computer data file for a coded data element of the XML computer data file, the query search via the XML position mapping structure to the starting and ending positions of the coded data element of the XML computer data file; and parse the XML computer data file to determine:
current code lengths of data element and attribute names and values; and
file header length containing metadata.

10. The computer program storage device of claim 9, where the program of instructions executable by the machine further comprises instructions that, when executed, cause the machine to:
use at least one of the following computational steps to determine the starting and ending position(s) of a node when the nodes of the coded data element(s) are in depth-first order:
starting position of an element name=sumEN+numEN*2+sumEV+sumAN+sumAV+numAN*4+sumLD+numLD*3+2;
starting position of an element value=sumEN+numEN*2+sumEV+sumAN+sumAV+numAN*4+sumLD+numLD*3+1;
starting position of an attribute name=sumEN+numEN*2+sumEV+sumAN+sumAV+numAN*4+sumLD+numLD*3+1;
starting position of an attribute value=starting position of an attribute name+lengthAN+2;
ending position of a node=starting position of node+length of node−1; or
ending position of a fragment=ending position of last node in fragment+sumLD+numLD*3.

11. The computer program storage device of claim 9, where the numeric node identifier (ID) for each node of the coded data elements comprises the breadth-first numeric node identifier (ID) and the program of instructions executable by the machine further comprises instructions that, when executed, cause the machine to:
map each breadth-first numeric node identifier (ID) to the depth-first numeric node identifier (ID) within the generated XML position mapping structure.

12. The method of claim 1, where linking, in response to the query search on the tree structure of the XML computer data file for the coded data element of the XML computer data file, the query search via the XML position mapping structure to the starting and ending positions of the coded data element of the XML computer data file, comprises:
identifying, via the defined starting and ending position of the coded data element within the XML computer data file, a location of the coded data element within the XML computer data file; and performing the query search to retrieve the coded data element from the XML computer data file without loading the entire XML computer data file into the memory.

13. The system of claim 5, where, in being programmed to link, in response to the query search on the tree structure of the XML computer data file for the coded data element of the XML computer data file, the query search via the XML position mapping structure to the starting and ending positions of the coded data element of the XML computer data file, the processor is programmed to:

identify, via the defined starting and ending position of the coded data element within the XML computer data file, a location of the coded data element within the XML computer data file; and perform the query search to retrieve the coded data element from the XML computer data file without loading the entire XML computer data file into the memory.

14. The computer program storage device of claim 9, where the program of instructions executable by the machine that cause the machine to link, in response to the query search on the tree structure of the XML computer data file for the coded data element of the XML computer data file, the query search via the XML position mapping structure to the starting and ending positions of the coded data element of the XML computer data file, comprises instructions that, when executed, cause the machine to:

identify, via the defined starting and ending position of the coded data element within the XML computer data file, a location of the coded data element within the XML computer data file; and perform the query search to retrieve the coded data element from the XML computer data file without loading the entire XML computer data file into the memory.

* * * * *